July 11, 1967   J. C. MORTON   3,330,370
STAIR CLIMBING DEVICE
Filed Sept. 1, 1965   2 Sheets-Sheet 1

INVENTOR
John C. Morton
BY Robert E. Kleve
ATTORNEY

July 11, 1967  J. C. MORTON  3,330,370
STAIR CLIMBING DEVICE
Filed Sept. 1, 1965  2 Sheets-Sheet 2

INVENTOR
John C. Morton

BY Robert E. Kleeve
ATTORNEY

United States Patent Office 3,330,370
Patented July 11, 1967

3,330,370
STAIR CLIMBING DEVICE
John C. Morton, Bismarck, N. Dak. 58501
Filed Sept. 1, 1965, Ser. No. 484,321
3 Claims. (Cl. 180—9.22)

This invention relates to elevator apparatus, more particularly, the invention relates to stair climbing equipment.

It is an object of the invention to provide a novel stair climbing apparatus for a two wheeled dolly to elevate the dolly up a flight of stairs, when the dolly is carrying a load.

It is a further object of the invention to provide a novel hand truck having a compact power driven stair engaging means to engage the steps of a pair of stairs to raise or lower the truck from one step to the next.

It is a further object of the invention to provide a novel stair climbing apparatus for raising or lowering loads up or down a flight of stairs.

Further objects and advantages of the invention will become apparent as the description proceeds and when taken in conjunction with the accompanying drawings wherein.

Briefly stated, the invention comprises a hand truck having an endles chain drive mounted centrally along the back lower portion of the hand truck, a duel set of rollers with each set mounted to the endless chain in equally spaced relation to each other, a motor mounted to the hand truck with a gear reduction transmitting power from said motor to said chain drive, and with said chain drive moving said rollers downward to engage the steps of a flight of stairs to raise the hand truck up the steps of the stairs.

Figures 1, 2, 3:
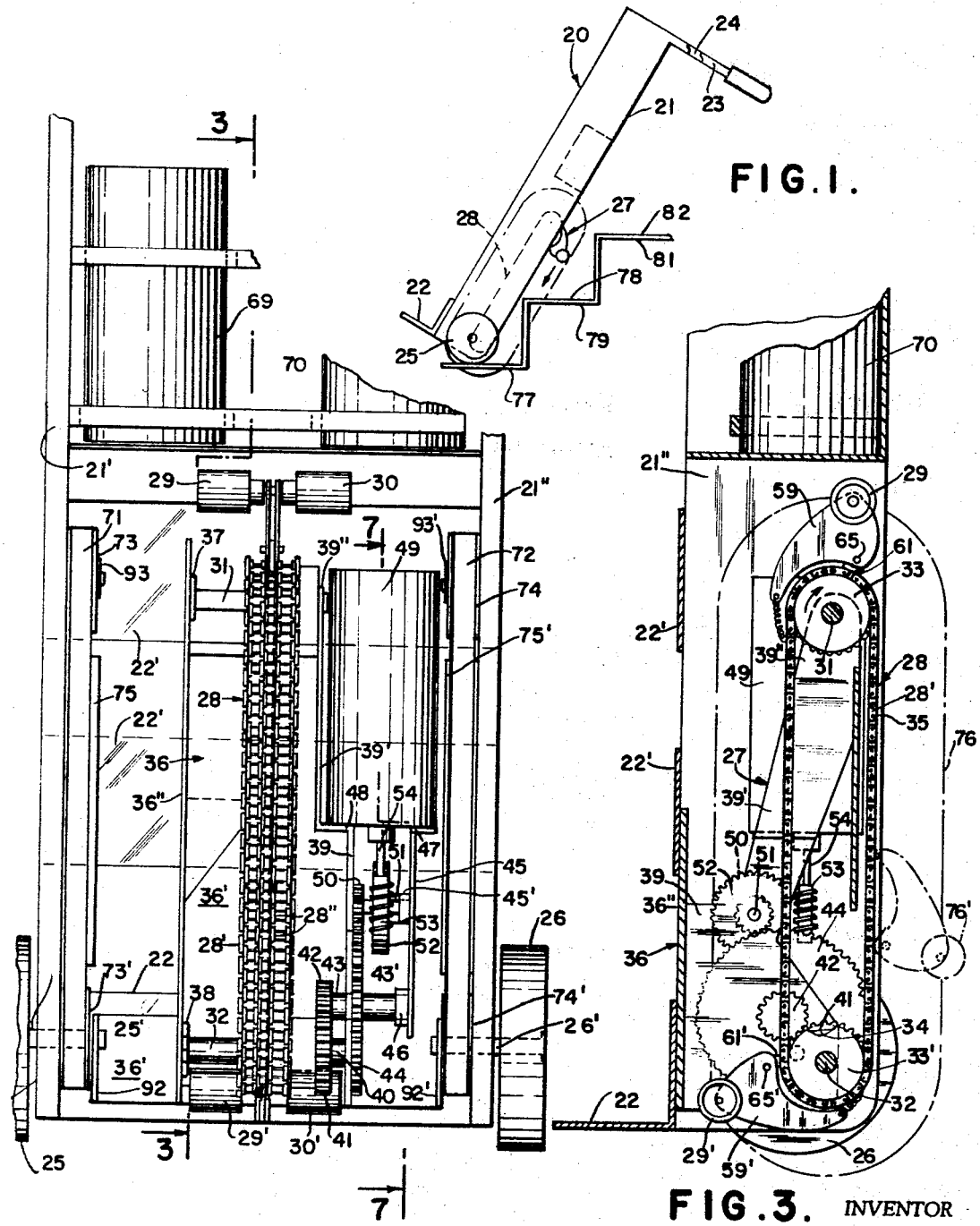
FIGURE 1 is a side elevational view of the stair climbing hand truck invention.
FIGURE 2 is a back elevational view of the stair climbing hand truck invention.
FIGURE 3 is a cross-sectional view taken along line 3—3 of FIGURE 2.
Figure 4:
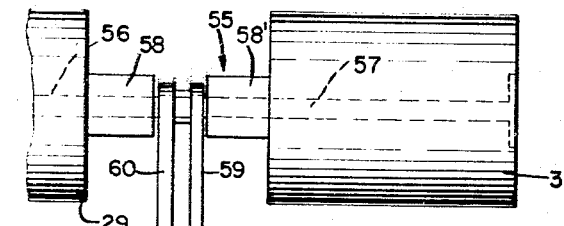
FIGURE 4 is a fragmentary enlarged back elevational view of the top roller structure and chain belt drive.
Figure 5:
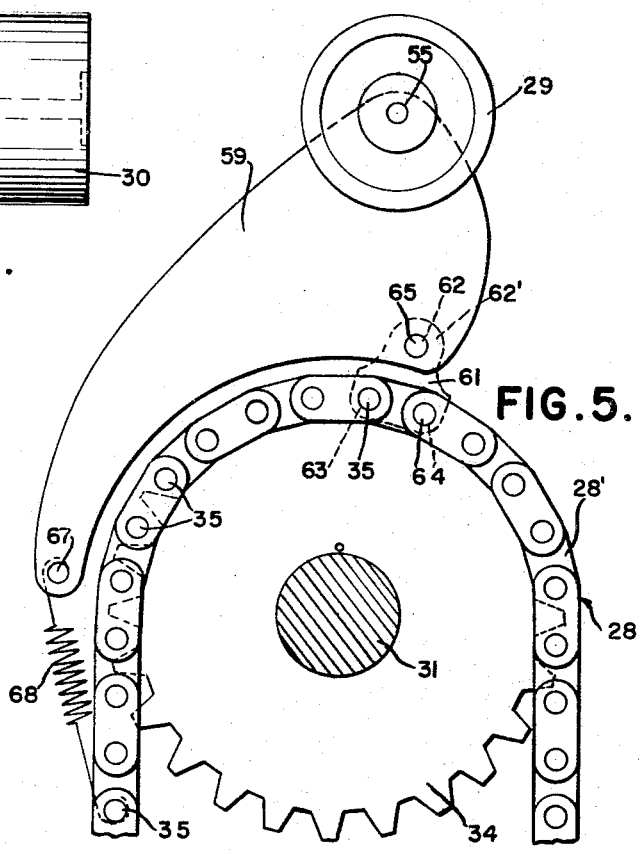
FIGURE 5 is a fragmentary enlarged side elevational view of the roller structure and chain belt drive.
Figure 6:
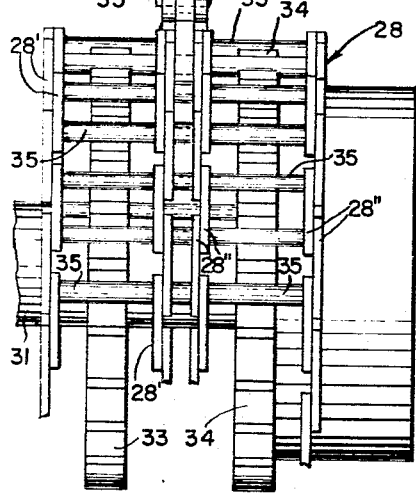
FIGURE 6 is a fragmentary enlarged back elevational view of the bottom roller structure and chain belt drive.

Referring more particularly to the drawings, in FIGURE 1, the hand truck stair climbing invention 20 is illustrated as having a conventional hand truck frame 21 with an L-shaped flange 22 mounted along its front to lift and carry objects on the truck. The truck frame 21 has a pair of handles 23 and 24, parallel to one another and extending rearward from the upper end of the truck frame, to manipulate the hand truck invention. A pair of wheels 25 and 26 are mounted to the bottom of the frame for the frame to roll upon.

Within the frame 21 is a stair climbing mechanism 27 having an endless link chain drive 28. The endless link chain drive or belt 28 caries a dual pair of rollers 29 and 30, and 29' and 30' with each pair spaced equally from the other along the chain.

The chain belt 28 is an endless link having a dual set of links 28' and 28''. The chain belt is rotatably supported at one end about a set of toothed gears 33 and 34 on a shaft 32. The links 28' and 28'' are connected together by pins 35.

The stair climbing mechanism 27 is supported by a main upright frame 36. The frame 36 is fixed to the L-shaped flange 22 of the dolly by suitable means, such as welding. The frame is also fixed to a series of cross plates 22' across the front of the dolly, which cross plates extend from one side wall 21' to the other side wall 21'' of the dolly frame 21.

The frame 36 has a front panel 36' and a side flange 36'' projecting rearward and formed integrally therewith. The side flange 36'' has a pair of collars 37 and 38 fixed thereto which collars rotatably support the shafts 31 and 32, respectively, at one end.

The frame 36 also has a second side flange 39 welded to the front panel 36' and projecting rearward. The second side flange has a projecting arm 39' which at its upper end 39'' has a bore which receives and rotatably supports the shaft 31 at its other end. The flange 39 also has a collar 40 which rotatably supports the shaft 32 at its other end.

A toothed gear 41 is fixed to the shaft 32, the gear 41 is in driving engagement with a toothed gear 42 directly in front. The gear 42 has a shaft 43 passing through a bore in the plate 39. The shaft 43 is fixed coaxially with an enlarged toothed gear 44 on the other side of the flange 39.

The shaft 43 is rotatably supported along one end by the bore of the flange 39. The shaft 43 is rotatably supported at the other end by being received in a collar 46 in a third side flange 45, which also projects rearwardly from the front plate 36''.

The second and third side flanges 39 and 45 have elbow portions 47 and 48 which support the motor 49 at its lower end. Suitable bolt means, not shown, connect the motor 49 to the elbows 47 and 48 to secure the motor.

A toothed gear 50 is in driving engagement with the toothed gear 44 and is fixed to a shaft 51. The toothed gear 52 is also fixed to the shaft 51 in coaxial relation to gear 50. The shaft 51 is rotatably supported at one end in a bore in flange 39 and is rotatably supported at the other end in a collar 45' in flange 45.

The toothed gear 52 is in driving engagement with the helical screw 53, and the helical screw 53 is fixed coaxially on the end of the drive shaft 54 of the motor 49.

The rollers 29 and 30 are rotatably mounted on shaft 55, which shaft has reduced shaft portions 56 and 57 for the rollers 29 and 30 respectively to rotate on. The inner ends of the shaft portions 56 and 57 have enlarged collars 58 and 58'.

A pair of pear shaped plates 59 and 60 of identical size and shape are mounted parallel to one another in fixed relation to each other and are fixed to the shaft 55.

A T-shaped plate 61 has three bores 62, 63, and 64. The bore 62 is located in the stem 62' of the plate 61 and the stem is adapted to be slid between the pear shaped plates 59 and 60, with a pin 65 passing through the plates and through the bore 62 in the T-shaped plate to pivotally connect the pear shaped plates 59 and 60 to the T-shaped plate 61.

The two bores 63 and 64 of the T-shaped plate are adapted to receive the pins 35 of the chain 28 to fix the T-shaped plate 61 to the link chain 28, centrally of the width of the chain.

The second set of rollers 29' and 30' are rotatably mounted on shaft 55', which shaft has reduced shaft portions 56' and 57' for the rollers 29' and 30' to rotate on. The inner ends of the shaft portions 56' and 57' have enlarged collars 66 and 66'.

A second pair of pear shaped plates 59' and 60', identical to each other and to the plates 59 and 60, are mounted parallel to one another and in fixed relation to each and are fixed to the shaft 55'.

A second T-shaped plate 61' is fixed to the chain 28 in the same manner as the T-shaped plate 61, and the pear shaped plates 59' and 60' are pivotally mounted to the T-shaped plate 61' by a pinion 65', in the same manner as the pear shaped plates 59 and 60 are pivotally mounted to the T-shaped plate 61.

The rollers 29 and 30, and 29' and 30' have rubber outer surfaces, about their cylindrical exterior.

A pinion 67 at the remote end of the pear shaped plates 59 and 60 secures the plates 59 and 60 together. A coil spring 68 is hooked at one end to the pin 67 and is hooked at the other end to a pin 35 of the chain 28, centrally of the width of the chain, and urges the pear shaped plates 59 and 60 against the link chain 28.

A pin 67' at the remote end of the pear shaped plates 59' and 60' secures the plates 59' and 60' together. A coil spring 68' is hooked at one end to the pin 67' and is hooked at the other end to a pin 35 of the chain 28, centrally of the width of the chain, and urges the pear shaped plates 59' and 60' against the link chain 28.

It is intended that the motor 49 be a conventional reversible type and powered by conventional electric batteries 69 and 70. A three way switch will be moved on the handle 23, of the hand truck 21, which will have three positions, or off position, and a position to energize one winding of the motor 49 to power the motor in one direction and a position to energize the other winding of the motor 49 to power the motor in the opposite direction. The batteries will be connected by the switch in series with one another and in series to one or the other winding, or not connected to either winding, when it is desired to turn off the motor, which connections being well known and conventional in character.

Conventional canvas belts 71 and 72 are mounted alongside of the walls 21' and 21" of the frames 21 of the dolly. The canvas belt 71 is wound about pulleys 73 and 73' at opposite ends, in a conventional manner, which pulleys 73 and 73' are rotatably mounted to the wall 21'. The canvas belt 72 is, at opposite ends, wound about pulleys 74 and 74'. Also in a conventional manner, pulleys 74 and 74' are rotatably mounted to the wall 21". The canvas belts have elongated plates 75 and 75' which hold the back face of the belts 71 and 72 outward beyond the walls 21' and 21" so that when the dolly is placed against the steps, the edge of the steps will engage the canvas belts rather than the walls 21' and 21", and the canvas belt may rotate as the dolly is moved upward or downward along the steps to prevent scraping of the dolly against the edge of the steps.

The walls 21' and 21" respectively have shafts 25' and 26' projecting outwardly from the walls to rotatably support wheels 25 and 26. Two flanges 92 and 92' project rearward from the plate 36' and have bores which support one end of the shafts of the pulleys 73' and 74' respectively. Two L-shaped flanges 93 and 93' project outwardly from the walls 21' and 21", respectively and have bores to rotatably support one end of the shaft of the pulleys 73 and 74. The pulleys 73 and 73' are rotatably supported at their other ends in bores in the wall 21'. The pulleys 74 and 74' are rotatably supported at their other ends by bores in wall 21".

Operation

When using the hand truck stair climbing invention 20 to haul objects along the horizontal surface, the motor 49 will not be energized, and the rollers 29 and 30, and 29' and 30' will be resting in their position illustrated in FIGURE 3, so as to be concealed within the confines of the walls 21' and 21" of the invention 20.

A conventional hand truck has one shaft which extends across the hand truck from wheel 25 to wheel 26. The hand truck invention 20, however, has two short stub shafts 25' and 26' which project through walls 21' and 21" respectively and are fixed thereto, and the wheels 25 and 26 are rotatably mounted to the outer ends of the shafts 25' and 26'. The inner ends of the shafts 25' and 26' project through pulleys 73' and 74', respectively, and rotatably support pulleys 73' and 74'. Two flanges 92 and 92' project rearward from the plate 36' and have bores which support the inner ends of the shafts 25' and 26' of the pulleys 73' and 74' respectively. Two L-shaped flanges 93 and 93' project outwardly from the walls 21' and 21", respectively, and have bores to rotatably support one end of the shaft of the pulleys 73 and 74. The pulleys 73 and 74 are supported at their outer ends in bores in walls 21' and 21", respectively.

When it is desired to use the invention to raise objects upon a flight of stairs, the operator will place the hand truck generally in the position illustrated in FIGURE 1. The operator will stand above the truck with his hands on the handles 23 and 24, and will turn the switch on the handle 23 to energize the winding of the motor 49, to drive the chain drive 28 in a clockwise direction, as viewed from FIGURES 1 and 3.

The energizing one winding of the motor 49 drives the chain 28, by the motor shaft 54 turning the helical gear 53. The helical gear 53 turns the gear 52, the gear 52 turns the gear 50, the gear 50 turns the gear 44, and the gear 44 turns the gear 42, the gear 42 turns the gear 41. The gear 41, being fixed to the outer end of the shaft 32, thereby turns the toothed gears 33' and 34' which cause the chain 28 to rotate in a clockwise direction when viewed from FIGURE 2.

The rotating of the chain 28 causes the rollers 29 and 30 to rotate clockwise about the path of the chain along the line indicated by the numeral 76. The rollers 29 and 30 and their plates 59 and 60 will move down from their position illustrated in solid lines in FIGURE 3 to their position illustrated in dashed lines in FIGURE 3, and designated by numeral 76' and continue on along the path of the chain 28.

As the rollers 29 and 30 move downward they will engage the upper face 78 of the step 79, and as they continue to move downward relative to the truck 21, will cause the truck to be raised upward, until the lower edges of the wheels 25 and 26 become even with the upper face 78 of the step. The rollers 29 and 30, following the path of the chain 28 will sweep below the level of the lower edge of the wheels 25 and 26, to swing the wheels 25 and 26 up over the edge of the step and onto the upper face 78 of the step, thereby raising the truck 20 from the upper face of the step 77 to the upper face 78 of the step 79.

The operation will be repeated as to step 81, by the rollers 29' and 30' engaging the upper face 82, of the step 81 to raise the hand truck onto the upper face 82, in the same manner as already described in connection with rollers 29 and 30.

The operation will continue to repeat itself to power the hand truck invention up as many steps as form the particular flight of stairs.

Figures 7, 8, 9:
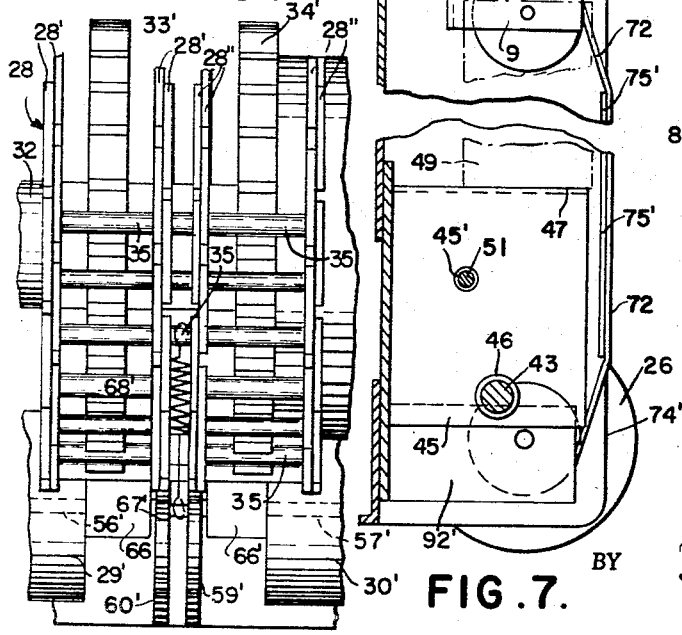
FIGURE 7 is a cross-sectional view taken along line 7—7 of FIGURE 3.
FIGURE 8 is an end view of a modified form of roller structure.
FIGURE 9 is a side view of the modified roller with portions of the roller cut away to reveal the interior.

A modified form of roller 84 for the rollers 29 and 30 and 29' and 30' is illustrated in FIGURES 8 and 9. The roller 84 is rotatably mounted on the shaft 85 for the roller. A pin 86 is fixed to the roller 84, and a plate 87 is fixed to the outer end of the shaft 85. The plate 87 has a cut out portion 88 with a leg 89 and leg 90 which limits the rotational movement of the roller 84, so that it may rotate in one direction until its pin 86 engages leg 89 and may rotate in the other direction until its pin 86 engages leg 90. A coil spring 91 has one end mounted to the pin 86 and the other end mounted to the leg 90, to continually urge the pin against the leg 90.

As the wheels 25 and 26 come into contact with the edge of the step as the truck is being raised upward, they will force the truck forward away from the step a slight distance to allow the wheels to clear the edge of the step, the modified form of roller 84 allows the rollers to rotate counterclockwise, when viewed from FIGURE 8, toward the edge of the step, to accommodate forward movement of the truck. But pin 86 will limit the rolling movement of the roller, to prevent the rollers from allowing the truck to accidentally roll off the front edge of the step, once placed on the step.

When operating the hand truck invention 20, to lower a load down a flight of stairs, the operation will be reversed, by reversing the motor 49 to drive the chain 28 in a counterclockwise direction when viewed from FIGURE 3.

Thus, it will be seen that a novel stair climbing invention has been provided which may be easily adapted to a conventional hand truck, and which may be fitted entirely within the confines of the walls of the hand truck, and which will take up only a minimum amount of space.

It will be seen that various changes and departures may be made to the invention without departing from the spirit and scope thereof and accordingly it is not intended that the invention be limited to that specifically described in the specifications or illustrated in the drawings but only as set forth in the appended claims wherein—

What is claimed is:

1. A hand truck comprising a pair of wheels to rotatably support said truck, an endless link chain belt, said chain belt having a dual set of links connected together, a dual pair of toothed gears spaced from one another to rotatably support the chain belt at opposite ends, a dual pair of rollers pivotally mounted to said chain with each pair of rollers mounted along said chain at spaced intervals from one another, spring means urging said rollers away from said chain, a motor powering said toothed gears to rotate said chain, said rollers being adapted to move downward by said chain to engage steps of a stairs to raise the hand truck up the steps, said rollers being adapted to follow the path of said chain and swing below the lower edge of the wheels of said truck, to swing the truck onto the steps and then said rollers being adapted to return upward with said chain and free of said steps.

2. A hand truck comprising a frame with a pair of wheels to rotatably support said frame, an endless belt mounted along the back of said frame, rollers mounted to said belt, belt support means rotatably supporting said belt at opposite ends, one of said supports being located below another of said supports with said lower support being located adjacent said wheels, said rollers being adapted to project outward and move downward on said belt to engage a step of a flight of stairs to raise said truck up the step of a flight of stairs, said rollers adapted to swing below the lower edge of said wheels about the axis of said lower support means to swing said truck up and onto said steps.

3. A hand truck comprising a frame having a pair of wheels to rotatably support said frame, an endless chain mounted centrally along the back of said truck, surface engaging means pivotally mounted at spaced locations to said chain, a motor mounted on said truck and powering said chain, rotatable belt supporting means rotatably supporting said belt with one of said rotatable supports located below the other end and adjacent said wheels, said surface engaging means adapted to project outward from said belt and move downward with said belt for engaging a step of a flight of stairs to raise said truck up the step, said surface engaging means adapted to travel around and project radially beyond the entire lower circumference of said wheels about the axis of said lower support to raise said truck up and onto the steps.

References Cited
UNITED STATES PATENTS

| | | | |
|---|---|---|---|
| 2,740,484 | 4/1956 | Montana | 280—5.22 X |
| 2,844,413 | 7/1958 | Gates | 180—9.22 X |
| 2,856,015 | 10/1958 | Stefan | 180—9.22 |
| 3,092,200 | 6/1963 | Chambers | 180—9.22 |

BENJAMIN HERSH, *Primary Examiner.*

RICHARD J. JOHNSON, *Examiner.*